Jan. 31, 1956  J. G. BRYN  2,732,648
FISHING TACKLE
Filed July 24, 1953  2 Sheets-Sheet 1
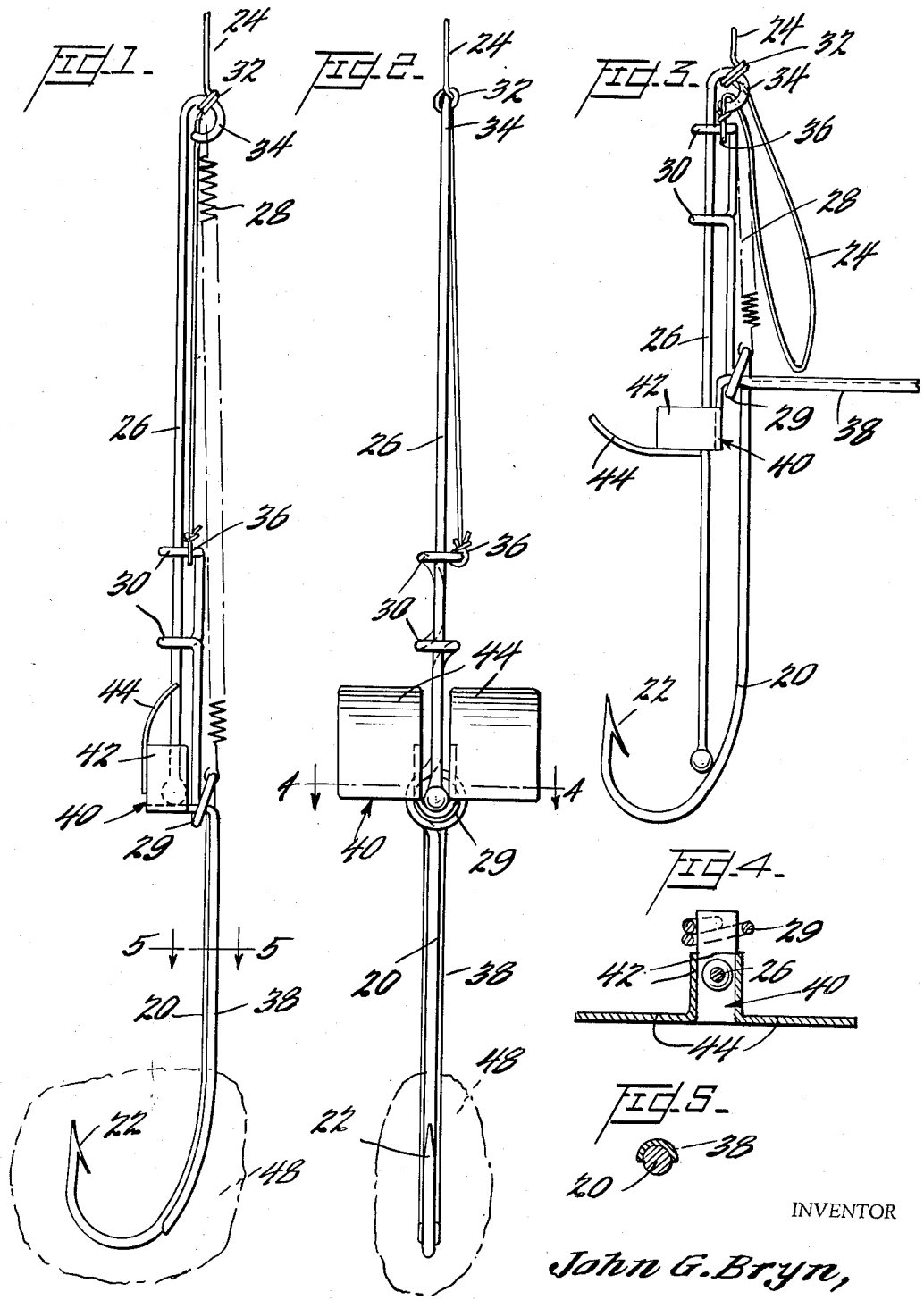
INVENTOR
John G. Bryn,
BY
ATTORNEYS

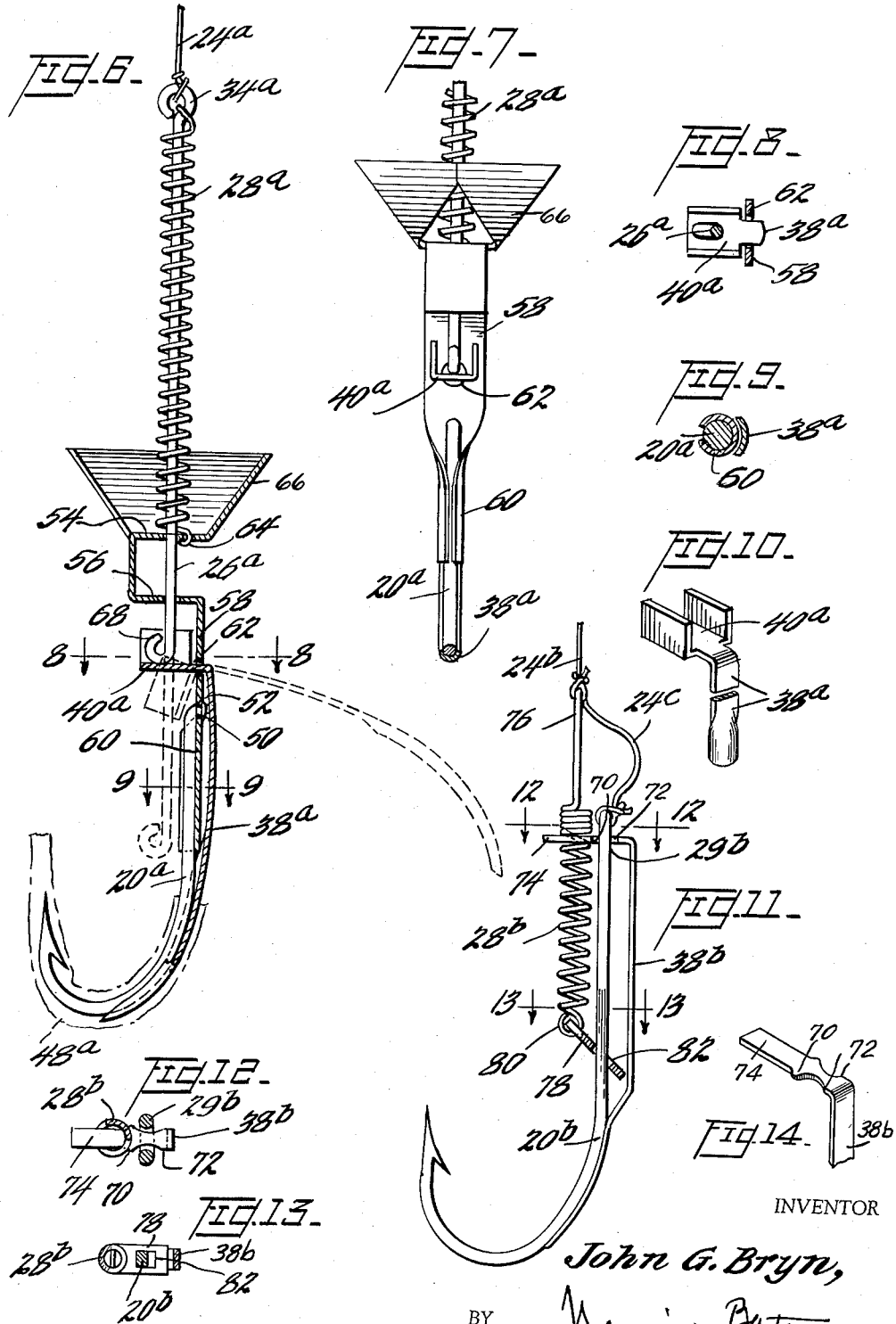

United States Patent Office 2,732,648
Patented Jan. 31, 1956

2,732,648

FISHING TACKLE

John G. Bryn, Chevy Chase, Md.

Application July 24, 1953, Serial No. 370,089

18 Claims. (Cl. 43—16)

The present invention relates to fishing tackle, and it provides means for giving a signal to the fisherman when the bait is removed or lost from the hook.

In fishing with a conventional fish hook to which bait is applied, it frequently happens that the bait is removed from the hook by a fish, crab or other inhabitant of the water without being caught on the hook, or the bait is lost from the hook by rubbing or catching on the bottom of the water or obstructions thereon, disintegration of the bait by action of the water thereon or other causes, leaving the hook without bait so that no fish will be attracted thereto.

A primary object of this invention is to provide means for giving a signal to the fisherman immediately upon removal or loss of bait from the hook, so that the fisherman may rebait the hook promptly and resume fishing.

Another object is to provide novel and improved fishing tackle which will automatically apply tension to the fishing line when a fish is caught on the hook, thereby preventing slack in the line which might permit the caught fish to disengage itself from the hook before or while the fish is being drawn in.

Another object of the invention is to provide a fish hook with means which will act to apply a tension to the bait on the hook and thereby retain it thereon until it is taken by a fish.

In the accompanying drawings which illustrate the preferred embodiments of the invention.

Figure 1 is a side elevation of a fish hook provided with the present invention.

Figure 2 is an elevation of the structure as viewed from the left in Fig. 1.

Figure 3 is a side elevation of the structure shown in Figs. 1 and 2 but showing the parts in the positions which they assume when tripped as the result of loss of bait from the hook.

Figure 4 is a detail horizontal section taken on the line 4—4 in Fig. 2, portions of the hook being omitted.

Figure 5 is a detail horizontal section taken on the line 5—5 in Fig. 1.

Figure 6 is a vertical section of another embodiment of the invention, showing in full lines the positions of the parts while bait is on the hook and showing in dotted lines the positions assumed by the parts when the bait is removed from the hook.

Figure 7 is an elevation of the central portion of the structure shown in Fig. 6 by the full lines.

Figure 8 is a detail horizontal section on the line 8—8 in Fig. 6, portions of the hook being omitted.

Figure 9 is a detail horizontal section on the line 9—9 in Fig. 6, portions of the hook being omitted.

Figure 10 is a detail perspective view of the trigger and a portion of the trigger releasing member.

Figure 11 is an elevation, partly in section, of a further embodiment of the invention.

Figure 12 is a detail horizontal section taken on the line 12—12 in Fig. 11, portions of the hook being omitted.

Figure 13 is a detail horizontal section taken on the line 13—13 in Fig. 11.

Figure 14 is a fragmentary detail perspective view of the trigger shown in Fig. 11.

In the embodiment of the invention shown in Figs. 1 to 5 inclusive, 20 represents a fish hook of any suitable size, the lower end of which is bent laterally to provide an upturned end which is provided with a barb 22, and 24 is the fishing line which may extend from the usual fishing rod or may be held in the hand of the fisherman. 26 is a rod which is guided to reciprocate longitudinally of the shank of the hook, and 28 is a tension spring which acts on the rod 26 to move it toward the lower or barbed end of the hook.

As shown in this embodiment of the invention, the shank of the fish hook is bent to form a lower eye 29 and a pair of upper eyes 30, these upper eyes serving to guide the rod 26 which extends loosely through them. The line 24 is secured, as by a knot 32, to an eye 34 formed on the upper end of the rod 26, and the line is extended downwardly from the eye 34 and fixed to a part of the fish hook, as to the upper eye 30 by a knot 36. The tension spring 28 is attached at its upper end to the eye 34 on the upper end of the rod 26, and is attached at its lower end to a part of the fish hook, as to the lower eye 29 thereon.

According to the present invention, the rod 26 is held in its raised position against the action of the spring 28 while the hook is baited by a trigger which is held in such rod restraining condition by a trigger-restraining and releasing member which is controlled according to the presence or absence of bait on the hook. The trigger restraining and releasing member comprises preferably an auxiliary shank 38 of channel or segmental cross section to fit closely against the shank of the fish hook and which extends downwardly from the upper portion of the shank to and preferably partly around the bend at the lower end of the hook, this member being located at the back of the hook or at the side thereof opposite to that at which the barb and the rod 26 are located. The upper end of the member 38 is bent forwardly at substantially a right angle to form a trigger 40 which is positioned at the front of the hook and on which the lower end of the rod 26 may rest and be supported while the auxiliary shank 38 lies against the shank of the hook, the trigger being preferably provided with a pair of flanges 42 to receive the lower end of the rod between them and thereby prevent displacement from the trigger. The auxiliary shank is sufficiently narrow to permit its insertion through the eye 29 of the hook during assembly of these parts, and to permit the auxiliary shank to pivot freely in the eye 29 at a point adjacent to the trigger. Wings 44 are preferably secured to or formed as parts of the trigger, which may be stamped from sheet metal, these wings projecting laterally from the hook when the rod 26 is tripped and released, as shown in Fig. 3, for a purpose which will be hereinafter described.

In using fishing tackle as hereinbefore described, the rod 26 is retracted by pulling it upwardly until the portion of the line 24 between the eye 34 and the upper eye 30 on the hook is taut, thereby pre-loading the spring 28, and the auxiliary shank 38 is swung against the shank of the fish hook, thereby swinging the trigger upwardly into place beneath the lower end of the rod 26, as shown in Figs. 1 and 2. While the parts are in such condition, the bait 48, which may be of any of the usual kind, is impaled on the hook and the lower portion of the auxiliary shank which lies close to or against the back of the hook. The bait thus applied to the hook holds the auxiliary shank against the hook, and the trigger controlled by the auxiliary shank is held in restraining position beneath the lower end of the rod 26 against the action of the spring 28 which tends to move the rod 26 downwardly. This action of the spring also tends to swing the auxiliary shank away from the hook, thereby placing a tension upon the bait which acts to hold it on the hook. If the bait is lost from the hook from any cause before a fish is caught, leaving the hook un-baited, the auxiliary shank is released and, under the action of the spring 28 on the trigger 40, it swings away from the hook about the eye 29 as a pivot, thereby tilting the trigger 40 downwardly into an upright position, or substantially so, and releasing the lower end of the rod 26 which is shot downwardly under the action of the spring 28 into the position shown in Fig. 3. This sudden motion thus imparted to the rod 26 is transmitted to the line 24 and imparts a sharp jerk thereto which will be felt by the hand of the fisherman holding the fishing rod or the line as a signal indicating that the bait has been lost from the hook. Since the lower end of the spring 28 is connected to the hook, a reaction from the jerk applied to the line by the spring will be sustained by the hook, and in order to sustain this reaction more effectively and thereby intensify the jerk applied to the line, it is preferable to employ the wings 44 which swing out when the trigger releases the rod 26 and act on the water to damp or retard resultant upward movement of the hook under the action of the spring.

If a fish is caught on the hook and the bait is dislodged thereby, the auxiliary shank 38 will be released and the rod 26 will be released, and a jerk will be imparted to the line, as before described to signal to the fisherman of the presence of a fish on the hook, and at the same time, the spring 28 which connects the line to the hook will contract and take up any slack that might otherwise develop and thereby permit the fish to escape from the hook. Under the pull of the fish caught on the hook, the line secured to the upper end of the rod 26 and the upper eye on the hook will provide a direct connection between the line and hook to sustain such pull of the fish if sufficient to overcome the power of the spring 28. After a fish has been removed from the hook, the parts may be restored to operative condition and re-baited, as hereinbefore described.

The embodiment of the invention shown in Figs. 6 to 10 inclusive is generally similar to that shown in Figs. 1 to 5 inclusive but may possess certain advantages in manufacture. In this embodiment of the invention, the hook 20a, instead of being provided with eyes on its shank, has its upper end bent back as at 50, and the guide for the rod 26a is formed from sheet metal or other suitable material of sufficient rigidity having vertically spaced upper portions 54 and 56 through which the rod 26a is slidable, and a downward extension 58 adapted to lie against the back of the shank of the hook and having an aperture 52 therein into which the rearwardly bent end 50 of the hook is inserted or riveted, and the lower portion of the extension 58 is formed into a sleeve 60 which embraces the upper portion of the shank of the hook and thereby forms a firm and secure connection therewith. The extension 58 is also provided with an aperture 62 through which the auxiliary shank 38a may be inserted and in which this shank may pivot to swing against the back of the hook, as shown by the full lines in Fig. 6 and to be held in such position by the bait on the hook, or to swing away from the hook into the dotted line position as shown in said figure when the bait is lost from the hook. The upper portion of the auxiliary shank 38a is bent at a right angle to form the trigger 40a which, while the auxiliary shank lies against the hook projects horizontally from the extension 58 of the guide and into position beneath the lower end of the rod 26a and to retain it in its upper or retracted position against the action of the spring 28a the upper end of which is attached to an eye 34a on the upper end of the rod and to which the fishing line 24a is attached, the lower end of the spring being hooked into or otherwise suitably attached to the member 54 of the guide, as indicated at 64, the spring 28a being a tension spring which acts to impel the rod 26a downwardly from its full line position shown in Fig. 6 to its dotted line position shown in that figure when released by the trigger to impart a jerk to the line due to loss of bait from the hook, substantially as hereinbefore described in connection with Figs. 1 to 5 inclusive. The upper portion of the guide however is formed as a body having flared sides 66 to act on the water to damp or retard upward movement of the hook under the reaction thereon under the action of the spring when released. In this embodiment, the line 24a may be attached to only the eye 34a at the upper end of the rod 26a, the lower end of the rod being provided with an eye or enlargement 68 which will abut against the under side the guide member 56 and thereby provide a direct connection between the line and hook if the pull on the line is sufficient to expand the spring to its limit.

Figs. 11 to 13 illustrate a simpler embodiment of the invention which is suitable for use with a conventional form of fish hook 20b having an eye 29b at the upper end of its shank. In this form of the invention, the auxiliary shank 38b is of a width and length to be inserted through the eye 29b and to lie closely against the back of the hook so that the bait may be placed over the lower portions of the hook and of the auxiliary shank, and to pivot in the eye 29b to swing away from the hook when released by loss of bait. If desired, lugs 70 and 72 may be provided on the edges of the auxiliary shank which occupy positions at opposite sides of the eye 29b to permit pivoting movement of the auxiliary shank in the eye but prevent displacement therefrom. The upper end of the auxiliary shank is bent at a right angle to form a trigger 74 which projects forwardly from the hook, and this trigger is adapted to be inserted between appropriate convolutions of a coiled tension spring 28b. One end of the spring 28b has an eye 76 to which the line 24b may be tied, and the line is extended down and tied to the eye 29b on the shank of the hook, this portion of the line being slack and forming a loop 24c when the trigger is inserted between convolutions of the spring 28b. The other or lower end of this spring is adapted for attachment to the shank of the hook, preferably by a clutch plate 78 which is pivotally connected to an eye 80 on the lower end of the spring 28b. The clutch plate has an aperture 82 therein through which the shank of the hook extends, this aperture being somewhat larger than the cross section of the shank of the hook so that the clutch plate may occupy a plane at an acute angle to the longitudinal axis of the shank of the hook and will be slidable downwardly on the shank of the hook when pulled downwardly to tension the spring, and the tension of the spring will pull the clutch plate into such acute angular relation with the shank of the hook and thereby frictionally hold the clutch plate from upward movement and maintain the spring under tension. The upper portion of the auxiliary shank 38b may be offset from the shank of the hook, as shown, in order to avoid interference with the operation of either of these parts, but the lower portion of the auxiliary shank is adapted to lie close to the hook in the region of the bend therein to receive the bait.

In using fishing tackle constructed in accordance with this embodiment of the invention, the bait is impaled upon the lower portions of the shank of the hook and the auxiliary shank while the latter lies against the back of the hook and the spring 28b is slack, the trigger 74 is inserted between convolutions of the spring near its top, and the clutch plate 82 is drawn downwardly on the shank of the hook to tension the portion of the spring beneath the trigger, the tension of the spring pulling the clutch plate into acute angular position on the shank of the hook so that it will be locked against upward movement thereon and the portion of the spring below the trigger will be maintained under tension. The portion of the spring above the trigger will be contracted and it can expand only to the extent limited by the loop 24c in the line by a pull on the line, which will be insufficient to release the trigger 74 from the spring in which it is held frictionally.

If the bait is lost from the hook before a fish is caught thereon, the auxiliary shank 38b will be released and will swing away from the fish hook under the tension of the spring 28b acting on the trigger 74, causing the trigger to swing into a downwardly tilted position which will permit the spring to slip off the trigger. The spring then imparts a sharp jerk to the line 24b transmitted thereto through the upper portion of the spring which will be permitted by the loop 24c in the line, thereby signaling loss of bait to the fisherman holding the fishing rod or the line. The hook may then be re-baited in the manner hereinbefore described. If a fish is caught on the hook, the pull on the line in pulling in the fish will be transmitted to the hook through the spring 28b so that no slack can occur in the line which might permit the fish to escape from the hook, and if the pull of the fish on the line is sufficiently strong, the line will be connected to the hook through the portion 24c of the line which will then straighten.

Each of the embodiments disclosed provides means for giving a signal to the fisherman of loss of bait from the hook, means for applying tension to the bait to prevent dropping thereof from the hook until taken by a fish, and means for automatically applying tension to the fishing line when a fish is caught on the hook and while being pulled in, thereby avoiding slack in the line which might permit the fish to escape from the hook.

I claim:

1. The combination with a fish hook having means for connecting it to a fishing line, of a member movable relatively to the hook into a position to cooperate therewith to receive bait, and means controlled by movement of said member and operative in response to removal of bait from the hook to transmit a signal to the fisherman through the line.

2. In fishing tackle, the combination with a fish hook having means for connecting it to a fishing line, of means coacting with said hook for imparting a signal impulse to the line, and controlling means for the signal means positioned relatively to the hook to be restrained by bait on the hook to thereby maintain the signal means in inactive condition and releasable in response to removal of bait from the hook to condition the signal means for operation.

3. In fishing tackle, means for giving a signal to a fishing line of loss of bait from the hook, comprising a member movable into proximity to the hook to cooperate therewith in receiving bait, means acting on said member to move it away from the hook, and means controlled by said member and operative in response to movement thereof away from the hook upon loss of bait to impart a signal to the line.

4. Fishing tackle comprising a fish hook, a resilient member, means for connecting said member to the hook and to a fishing line, and means controlled by the presence or absence of bait on the hook for holding said member in loaded condition while bait is on the hook and for releasing said member in response to loss of bait from the hook to impart a signal impulse to the fisherman through the line.

5. Fishing tackle as defined in claim 4, including means for damping the reaction of said resilient member on the hook.

6. Fishing tackle comprising a fish hook, a resilient member means for connecting said member to the hook and to a fishing line, releasable means for holding said resilient member in loaded condition, a second member movable into proximity to the hook to receive bait placed on the hook and to be held in such position by bait on the hook and movable by said resilient means away from the hook in response to loss of bait from the hook to trip said releasable means.

7. Fishing tackle comprising a fish hook, a resilient member, means for connecting said member to a fishing line and to the hook, releasable means for holding the resilient member in loaded condition, and a second member movable into proximity to the hook to receive there- with bait placed on the hook and to be held in such position by bait on the hook and movable away from the hook by said resilient member in response to loss of bait from the hook to trip said holding means and thereby release the resilient member for action to impart a signal impulse to the fisherman through the line.

8. Fishing tackle comprising a fish hook, a tension spring, means for connecting said spring to the hook and to a fishing line, means cooperating with the spring to hold said spring under tension, and a member movable into proximity to the hook to receive bait placed on the hook and to be held thereby in such position and releasable by loss of bait from the hook for movement by the spring away from the hook to trip said holding means and thereby release the spring for action on the line to impart a signal impulse to the fisherman through the line.

9. Fishing tackle comprising a fish hook, a tension spring, means for connecting the respective ends of said spring to a fishing line and to the hook, and a member pivotally mounted on the hook for movement of one end thereof against the hook to receive bait placed on the hook and means at the other end of said member operative to hold the spring in tension while said member is held against the hook by bait thereon and to release the spring for contraction and thereby impart an impulse to the fisherman through the line by movement of said member away from the hook in response to loss of bait from the hook.

10. Fishing tackle comprising a fish hook, a tension spring, means for connecting the ends of said spring respectively to the hook and to a fishing line, and a member pivotally mounted on the hook and having a portion thereof at one side of its pivot shaped to lie against the hook and having a portion at the other side of its pivot extending at an angle to its first mentioned portion into a position to hold the spring in tension while said member lies against the hook and tiltable to release the spring for contraction by movement of said member away from the hook.

11. Fishing tackle comprising a fish hook, a tension spring, means at one end of said spring for connecting said spring to a fishing line and means at its other end for connecting it to the hook, a member guided to reciprocate relatively to the hook and connected at one end to the first mentioned end of the spring and movable in a direction to tension the spring, a trigger to cooperate with the other end of said member to hold the spring in tension, and a controllnig member movable into proximity to the hook to receive bait placed on the hook and to be held in such position by bait on the hook, said controlling member being under action of the spring to move away from the hook in response to loss of bait from the hook and thereby trip the trigger to release the spring for action on the line to impart a signal impulse thereto.

12. Fishing tackle comprising a fish hook, a spring, means for connecting the ends of said spring respectively to the hook and to a fishing line, a trigger for holding the spring in a loaded condition, and a member mounted movably relatively to the hook for movement to and from proximity thereto and connected to the trigger to set the trigger to hold the spring in loaded condition while said member is in proximity to the hook and to actuate the trigger to release the spring and thereby transmit a signal to the fisherman through the line.

13. Fishing tackle comprising a fish hook, a spring, means for connecting one end of said spring to the hook, means for connecting the other end of said spring to a fishing line, a member reciprocable relatively to the hook and having means at one end thereof for connecting said member to the line and to the spring, a trigger on the hook positioned to coact with the other end of said member to hold the spring in loaded condition, and a second member mounted on the hook for movement to and from proximity thereto and coacting with the trigger to maintain the spring in loaded condition while said member is in proximity to the hook and to actuate the trigger to release the spring for action by movement of said second member out of proximity to the hook.

14. Fishing tackle comprising a fish hook having a shank, a sheet metal member secured to the shank of the hook and forming a guide, a rod slidably mounted in said guide for movement longitudinally of the shank of the hook, a spring having means at one end for connecting it to the upper end of said rod and to a fishing line, and having means for attaching its other end to said sheet metal member, and an auxiliary shank pivotally mounted on said member and having a portion shaped to lie in proximity to the hook, and having another portion positioned to engage the lower end of said rod to maintain the spring in loaded condition while the auxiliary shank is in proximity to the hook and which is tiltable to release said rod when the auxiliary shank swings away from the hook.

15. Fishing tackle as defined in claim 14, wherein said sheet metal member is provided with flared sides to act on the water as a damper to the reaction of said spring on the hook.

16. Fishing tackle comprising a fish hook having a shank bent to form a pair of alined eyes, a rod slidably guided by said eyes and having means for connecting it to a fishing line, a tension spring connecting the rod and the hook and operative to pull the rod toward the hook, and an auxiliary shank pivotally mounted on the shank of the hook and movable to and from a position in proximity to the hook and having a portion engageable with the rod to restrain the latter from operation while the auxiliary shank is in proximity to the hook and being movable into a position to release said rod for operation when the auxiliary shank moves out of proximity to the hook.

17. Fishing tackle as defined in claim 16, including wings on said auxiliary shank which are movable into a transverse position relatively to the shank of the hook when said auxiliary shank moves out of proximity to the hook.

18. Fishing tackle comprising a fish hook, a coiled tension spring having means at its upper end for connecting it to a fishing line and at its lower end for connecting it to the shank of the hook to hold the spring in tension, and a member pivotally mounted on the hook and having a portion adapted to lie in proximity to the hook and having another portion positioned to engage between convolutions of the spring to maintain tension on the spring while said member lies in proximity to the hook, said other portion of said member acting under the influence of the spring to move said member out of proximity to the hook and being tiltable by said movement of said member to release the spring for contraction.

References Cited in the file of this patent

UNITED STATES PATENTS

| | | |
|---|---|---|
| 1,543,247 | Carpenter | June 23, 1925 |
| 2,575,852 | Trowbridge | Nov. 20, 1951 |

FOREIGN PATENTS

| | | |
|---|---|---|
| 1,228 | Great Britain | 1879 |